(12) United States Patent
Lee et al.

(10) Patent No.: US 9,350,161 B2
(45) Date of Patent: May 24, 2016

(54) UNDERVOLTAGE LOCKOUT CIRCUIT, SWITCH CONTROL CIRCUIT AND POWER SUPPLY DEVICE COMPRISING THE UNDERVOLTAGE LOCKOUT CIRCUIT

(71) Applicant: FAIRCHILD KOREA SEMICONDUCTOR LTD., Bucheon (KR)

(72) Inventors: Sungpah Lee, Seoul (KR); Wookang Jin, Bucheon (KR)

(73) Assignee: Fairchild Korea Semiconductor LTD (KR)

( * ) Notice: Subject to any disclaimer, the term of this patent is extended or adjusted under 35 U.S.C. 154(b) by 397 days.

(21) Appl. No.: 14/088,607

(22) Filed: Nov. 25, 2013

(65) Prior Publication Data

US 2014/0146429 A1 May 29, 2014

(30) Foreign Application Priority Data

Nov. 26, 2012 (KR) .................. 10-2012-0134811

(51) Int. Cl.
*H02H 3/24* (2006.01)
*H02H 3/32* (2006.01)

(52) U.S. Cl.
CPC .............. *H02H 3/243* (2013.01); *H02H 3/24* (2013.01); *H02H 3/325* (2013.01)

(58) Field of Classification Search
USPC .......................................... 361/92
See application file for complete search history.

(56) References Cited

U.S. PATENT DOCUMENTS

| | | | | |
|---|---|---|---|---|
| 5,739,680 A * | 4/1998 | Lim | .................. | G05F 3/222 323/313 |
| 5,805,401 A * | 9/1998 | Schuellein | .................. | H03K 17/30 361/115 |
| 6,600,639 B1 * | 7/2003 | Teo | .................. | G05F 3/247 361/18 |
| RE39,341 E * | 10/2006 | Kataoka | .................. | H05B 41/2828 315/209 R |
| 2002/0141121 A1 * | 10/2002 | Brohlin | .................. | H02H 3/243 361/18 |
| 2005/0237023 A1 * | 10/2005 | Zhang | .................. | H02J 7/0068 320/128 |
| 2007/0201252 A1 * | 8/2007 | Yang | .................. | H02H 7/1222 363/56.01 |
| 2009/0231770 A1 * | 9/2009 | Schuelke | .................. | H02H 3/24 361/92 |
| 2009/0302822 A1 * | 12/2009 | Chao | .................. | G05F 3/30 323/313 |
| 2011/0050308 A1 * | 3/2011 | Huang | .................. | H02M 3/33507 327/198 |
| 2014/0146429 A1 * | 5/2014 | Lee | .................. | H02H 3/243 361/86 |

OTHER PUBLICATIONS

Fairchild Semiconductor, FSL206MR Green Mode Fairchild Power Switch (FPS TM), Sep. 2012, 14 pages.

* cited by examiner

*Primary Examiner* — Ronald W Leja
(74) *Attorney, Agent, or Firm* — Grossman Tucker Perreault & Pfleger PLLC

(57) ABSTRACT

Exemplary embodiments of the present invention relate to an under-voltage lockout circuit, and a switching control circuit and a power supply including the same. The under-voltage lockout circuit according to an embodiment of the invention includes a first under-voltage lockout circuit comparing a driving voltage with a first reference voltage and a second under-voltage lockout circuit generating an under-voltage lockout signal based on a result of the comparison between the driving voltage and the second reference voltage. The first under-voltage lockout circuit stops operation of the second under-voltage lockout circuit when the driving voltage is lower than the first reference voltage and operates the second under-voltage lockout circuit when the driving voltage is higher than the first reference voltage. Power consumption of the first under-voltage lockout circuit is limited by a first current that generates the first reference voltage.

20 Claims, 6 Drawing Sheets

UNDERVOLTAGE LOCKOUT CIRCUIT, SWITCH CONTROL CIRCUIT AND POWER SUPPLY DEVICE COMPRISING THE UNDERVOLTAGE LOCKOUT CIRCUIT

CROSS-REFERENCE TO RELATED APPLICATION

This application claims priority to and the benefit of Korean Patent Application No. 10-2012-0134811 filed in the Korean Intellectual Property Office on Nov. 26, 2012, the entire contents of which are incorporated herein by reference.

BACKGROUND (a) Field

An embodiment of the invention relates to an under-voltage lockout circuit. Particularly, the embodiment relates to an under-voltage lockout circuit that can be applied to an integrated circuit that controls a high voltage output in a power supply.

(b) Description of the Related Art

An under-voltage lockout circuit is used to an integrated circuit (hereinafter, referred to as a switch control circuit) that controls switching operation of a power supply. The under-voltage lockout circuit controls protection operation that stops operation of a switch control circuit when a driving voltage supplied to the switch control circuit is an under voltage. For example, an enable level of a gate signal of the switch control circuit can be determined according to the driving voltage.

A conventional under-voltage lockout circuit is connected to the driving voltage, and determines whether a voltage is an under-voltage by comparing the driving voltage with a predetermined reference range. In this case, when the driving voltage is in an abnormal range, that is, when the driving voltage is an under-voltage, a static current is generated in the under-voltage lockout circuit. That is, power consumption occurs in the under-voltage lockout circuit due to the static current even though protection operation is performed for under-voltage lockout. Then, the power consumption is increased.

In order to prevent the increase of the power consumption, a shut-down signal is externally supplied to the switch control circuit to stop operation of the under-voltage lockout circuit according to a conventional art. However, the shut-down signal should be converted to a voltage range appropriate to a switch control circuit applied to a power supply that supplies a high voltage. This causes increase of the switch control circuit in size, and power consumption is additionally occurred during the conversion.

The above information disclosed in this Background section is only for enhancement of understanding of the background of the invention and therefore it may contain information that does not form the prior art that is already known in this country to a person of ordinary skill in the art.

SUMMARY

An embodiment of the invention provides an under-voltage lockout circuit that can reduce power consumption of an under-voltage lockout circuit while minimizing increase of a switch control circuit in size, and a switch control circuit and a power supply including the same.

An under-voltage lockout circuit according to an embodiment includes a first under-voltage lockout circuit configured to compare a driving voltage with a first reference voltage and a second under-voltage lockout circuit configured to generate an under-voltage lockout signal based on a result of the comparison between the driving voltage and the second reference voltage. The first under-voltage lockout circuit stops operation of the second under-voltage lockout circuit when the driving voltage is lower than the first reference voltage and operates the second under-voltage lockout circuit when the driving voltage is higher than the first reference voltage. Power consumption of the first under-voltage lockout circuit is limited by a first current that generates the first reference voltage.

The first under-voltage lockout circuit includes a first reference voltage source configured to generate a first reference voltage using the first current and a comparison means configured to output a result of comparison between the first reference voltage and the driving voltage. Operation of the second under-voltage lockout circuit is controlled based on the output of the comparison means.

The comparison means includes a first transistor including a gate to which the first reference voltage is input, a first terminal coupled with the driving voltage, and a second terminal coupled with an output terminal of the comparison means, and a second transistor configured to control a current flowing to the first transistor by mirroring the first current.

The first reference voltage source includes a first current source and a second current source configured to supply the first current, a third transistor including a drain coupled to the first current source, and a gate coupled to the drain, and a fourth transistor including a drain coupled to the second current source and a source of the first transistor and a gate coupled to the drain. A current mirror is formed by coupling the gate of the second transistor and the gate of the fourth transistor.

The first reference voltage is the sum of a gate-source voltage of the third transistor and a gate-source voltage of the fourth transistor.

The second under-voltage lockout circuit includes a switch coupled to the driving voltage, and configured to be switched based on a control signal generated based on a result of comparison between the driving voltage and the first reference voltage in the first under-voltage lockout circuit, a plurality of resistors connected to the switch in series, a reference voltage source configured to supply the second reference voltage, an under-voltage comparator including a first input terminal coupled with the reference voltage source and a second input terminal coupled with a detection voltage of a node where a first resistor and a second resistor among the plurality of resistors are coupled, and configured to generate an under-voltage lockout signal based on a result of comparison between an input of the first input terminal and the detection voltage; and a fifth transistor coupled to a third resistor among the plurality of resistors in parallel. The fifth transistor is controlled by the under-voltage lockout signal.

The second under-voltage lockout circuit further includes a third current source supplying a current to bias the reference voltage source.

The reference voltage source includes a zener diode, and a current of the third current source is supplied to a cathode of the zener diode and the cathode of the zener diode is coupled to the first input terminal of the under-voltage comparator. The second reference voltage is determined based on a zener voltage of the zener diode.

A first terminal of the switch is coupled to the driving voltage, a second terminal of the switch is coupled to a first terminal of the first resistor of the plurality of resistors, a second terminal of the first resistor is coupled to a first terminal of the second resistor, and a first terminal of the third resistor is coupled to a second terminal of the second resistor.

The under-voltage comparator has a hysteresis characteristic. The second reference voltage becomes a high reference voltage based on the hysteresis characteristic when the detection voltage is increased to a high voltage from a low voltage, and the second reference voltage becomes a low reference voltage based on the hysteresis characteristic when the detection voltage is decreased to a low voltage from a high voltage.

The first under-voltage lockout circuit includes a comparison means outputting the control signal based on a result of comparison between the first reference voltage and the driving voltage.

The first under-voltage lockout circuit includes a first transistor including a gate to which the first reference voltage is input, a first terminal coupled to the driving voltage, and a second terminal coupled to an output terminal of the comparison means. When the driving voltage becomes higher than the first reference voltage and thus the first transistor is turned on, the control signal is changed to a level that can turn on the switch by the driving voltage.

The first under-voltage lockout circuit further includes a first current source and a second current source configured to supply the first current and a second transistor configured to control a current flowing to the first transistor by mirroring the first current.

The first under-voltage lockout circuit further includes a third transistor including a drain coupled to the first current source and a gate coupled to the drain and a fourth transistor including a drain coupled to the second current source and a source of the first transistor and a fourth transistor including a gate coupled to the drain. A current mirror is formed by coupling the gate of the second transistor and the gate of the fourth transistor.

A switch control circuit according to an embodiment controls switching operation of a high-side switch and a low-side switch. The switch control circuit includes a first under-voltage lockout circuit configured to compare a driving voltage for controlling the switching operation of the high-side switch with a first reference voltage and a second under-voltage lockout circuit configured to generate an under-voltage lockout signal based on a result of comparison between the driving voltage and a second reference voltage. The first under-voltage lockout circuit stops the second under-voltage lockout circuit when the driving voltage is lower than the first reference voltage and operates the second under-voltage lockout circuit when the driving voltage is higher than the first reference voltage. Power consumption of the first under-voltage lockout circuit is limited by a first current that generates the first reference voltage.

The switch control circuit includes a driving controller configured to generate a first driving signal for controlling of switching operation of the high-side switch and a second driving signal for controlling switching operation of the low-side switch based on an input signal, a short-pulse generator configured to generate a first pulse and a second pulse based on the first driving signal, a high-side level shifter configured to level-shift the first pulse and the second pulse to a first logic signal and a second logic signal with reference to an output voltage of a node where the high-side switch and the low-side switch are coupled, and an SR latch configured to generate a first switching control signal that controls switching operation of the high-side switch based on the first logic signal and the second logic signal.

An output of the SR latch is reset by an output of the second under-voltage lockout circuit generated when the driving voltage is lower than the second reference voltage so that the switching operation of the high-side switch is stopped.

A power supply according to an embodiment includes a high-side switch, a low-side switch connected to the high-side switch in series, a switch control circuit configured to control switching operation of the high-side and low-side switches; and a diode and a capacitor connected in series between a power voltage supplied for operation of the switch control circuit and an output voltage of a node where the high-side switch and the low-side switch are coupled. The switch control circuit comprises a first under-voltage lockout circuit comprising a driving voltage generated in the capacitor with a first reference voltage and a second under-voltage lockout circuit configured to generate an under-voltage lockout signal based on a result of comparison between the driving voltage and a second reference voltage. The first under-voltage lockout circuit stops the second under-voltage lockout circuit when the driving voltage is lower than the first reference voltage and operates the second under-voltage lockout circuit when the driving voltage is higher than the first reference voltage. Power consumption of the first under-voltage lockout circuit is limited by a first current that generates the first reference voltage.

According to the embodiments of the invention, an under-power lockout circuit that can reduce power consumption of an under-voltage lockout circuit while minimizing size increase of a switch control circuit, a switch control circuit including the same, and a power supply including the same can be provided.

DETAILED DESCRIPTION OF THE EMBODIMENTS

Figure 1:
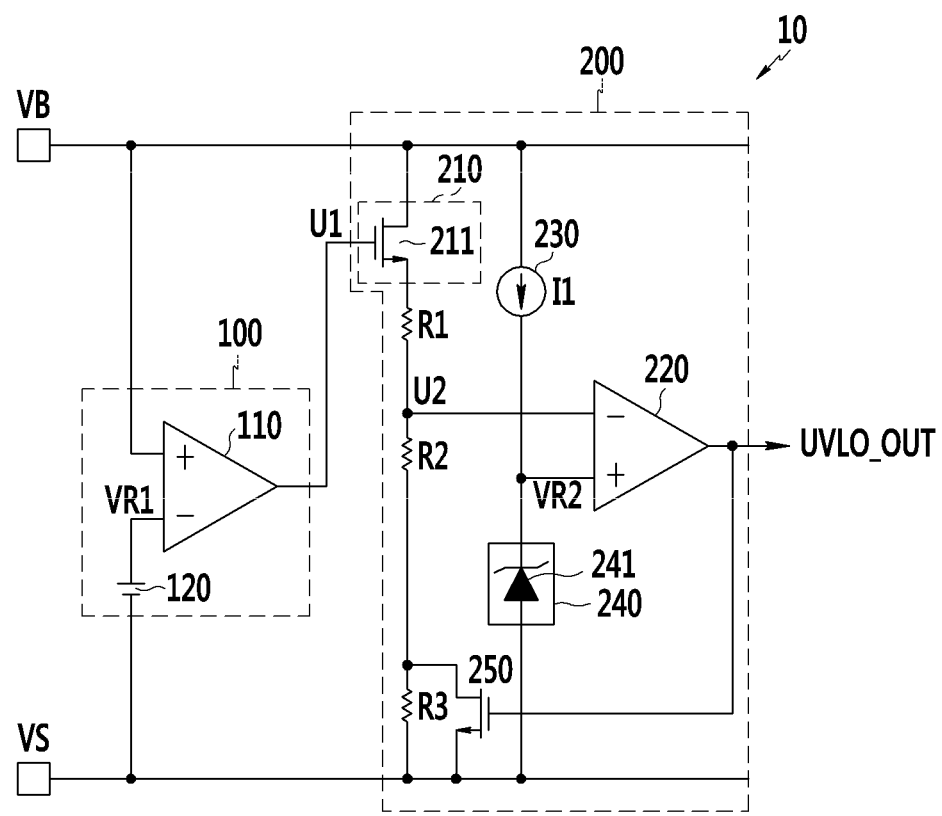
FIG. 1 shows a under-voltage lockout circuit according to an embodiment of the invention.

In the following detailed description, only certain embodiments of the invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, an under-voltage lockout circuit according to an embodiment of the invention, a switch control circuit including the same, and a power supply will be described with reference to the accompanying drawings.

FIG. 1 shows an under-voltage lockout circuit according to an embodiment of the invention.

As shown in FIG. 1, in an under-voltage lockout circuit 10, a voltage VS is a ground voltage and a voltage VB is a driving voltage. The under-voltage lockout circuit 10 includes a first under-voltage lockout circuit 100 and a second under-voltage lockout circuit 200.

The first under-voltage lockout circuit 100 reduces power consumption of the second under-voltage lockout circuit 200 by controlling operation of the second under-voltage lockout circuit 200 according to a result of comparison between the driving voltage VB and a first reference voltage VR1.

For example, the first under-voltage lockout circuit 100 stops operation of the second under-voltage lockout circuit 200 when the driving voltage VB is lower than the first reference voltage VR1, and starts operation of the second under-voltage lockout circuit 200 when the driving voltage VB is higher than the first reference voltage VR1. Then, power consumption occurring when the driving voltage VB is lower than the first reference voltage VR1 can be reduced.

In this case, the first under-voltage lockout circuit 100 can be designed to consume less power compared to the second under-voltage lockout circuit 200.

For example, the first under-voltage lockout circuit 100 includes a comparison means 110 and a first reference voltage source 120. When the driving voltage VB is lower than the first reference voltage VR1, power consumption occurs by a first current only to generate the first reference voltage VR1 in the first under-voltage lockout circuit 100. In this case, the first reference voltage VR1 is low level so that the first current is small and accordingly power consumption is low. Further, when the driving voltage VB is higher than the first reference voltage VR1, a current flowing to the voltage VS from the driving voltage VB is restricted by the first current, and the corresponding power consumption is low.

A first input terminal (+) of the comparison means 110 is connected to the driving voltage VB, and a second input terminal (−) of the comparison means 100 is connected to the first reference voltage VR1. An output of the comparison means 110 is high level when an input of the first input terminal (+) is higher than an input of the second input terminal (−), and is low level when the input of the first input terminal (+) is lower than the input of the second input terminal (−).

The output of the comparison means 110 is a control signal U1 that controls operation of the second under-voltage lockout circuit 200. The second under-voltage lockout circuit 200 is activated by a control signal U1 that is higher than a predetermined level and stops operation according to a low-level control signal U1.

The first reference voltage source 120 generates the first reference voltage VR1 using the first current. In this case, a ground of the first reference voltage source 120 is the voltage VS.

Figure 2:
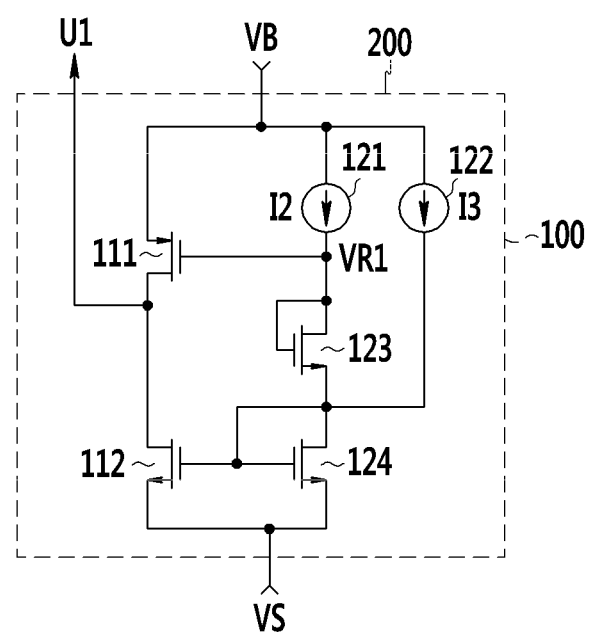
FIG. 2 is a first under-voltage lockout circuit according to the embodiment of the invention.

FIG. 2 shows one example of the under-voltage lockout circuit according to the embodiment of the invention.

As shown in FIG. 2, the comparison means 100 includes a transistor 111 and a transistor 112. The first reference voltage source 120 includes a first current source 121, a second current source 122, a transistor 123, and a transistor 124.

A source of the transistor 111 is connected to the driving voltage VB, a gate of the transistor 111 is connected to the first reference voltage VR1, and a drain of the transistor 111 is connected to the control signal U1.

A source of the transistor 112 is connected to the voltage VS, a gate of the transistor 112 is connected to a gate of the transistor 124, and a drain of the transistor 112 is connected to the control signal U1.

The transistor 112 forms a current mirror with the transistor 124, and a gate-source voltage of the transistor 112 is higher than a threshold voltage, and thus the transistor 112 is in the turn-on state. However, when the transistor 111 is in the turn-off state, no current can flow to the transistor 112. The transistor 112 constantly controls a current flowing to the transistor 111 when the transistor 111 is in the turn-on state.

In further detail, when the transistor 111 is in the turn-on state, the current sum (I2+I3) of the first current source 121 and the second current source 122 flowing to the transistor 111 is mirrored and then flows to the transistor 112. Thus, the current flowing to the comparison means 110 is controlled to the current mirrored from the current sum (I2+I3) by the transistor 112.

The first current source 121 generates the current I2 and the second current source 122 generates the current I3. In the embodiment of the invention, the current I2 and the current I3 are set to be equivalent to each other.

The gate and the drain of the transistor 123 are diode-connected, and the source of the transistor 123 is connected to the drain of the transistor 124. The drain of the transistor 123 is connected to the first current source 121 and the current I2 flows through the transistor 123.

The transistor 124 is in the diode-connection state, and the source of the transistor 124 is connected to the voltage VS. The drain of the transistor 124 is connected to the second current source 122 and the current I2 and the current I3 flow through the transistor 124. That is, 2*I2 current flows through the transistor 124.

When the current I2 flows to the transistor 123, a both-end voltage of Vgs is generated in the transistor 123, and when two times the current I2 flows to the transistor 124, a both-end voltage of 2 Vgs is generated in the transistor 124. Accordingly, the first reference voltage VR1 equals the sum of the voltage VS and 3 Vgs. (VR1=VS+3 Vgs)

Since the transistor 111 is in the turn-off state and the transistor 112 is in the turn-on state when the driving voltage VB is the voltage VS becomes a voltage level of the control signal U1. In this case, the switch 210 is turned off by the control signal U1.

When the driving voltage VB is higher than the first reference voltage VR1 and thus the transistor 111 is turned on, a current flows through the transistor 111 and the transistor 112. The driving voltage VB is divided by on-resistance between the transistor 111 and the transistor 112, and the control signal U1 becomes a divided voltage level. In this case, the switch 210 is turned on by the control signal U1.

Referring back to FIG. 1, the second under-voltage lockout circuit 200 includes the switch 210, first to third resistors R1 to R4, an under-voltage comparator 220, a current source 230, a reference voltage source 240, and a transistor 250.

The switch 210 includes a transistor 211, and the transistor 211 performs switching operation according to the control signal U1. The transistor 211 includes a drain connected to the driving voltage VB, a gate supplied with the control signal U1, and a source connected to a first terminal of the resistor R1.

The first resistor R1, the second resistor R2, and the third resistor R3 are connected in series between the switch 210 and the voltage VS. A second terminal of the first resistor R1 and a first terminal of the second resistor R2 are connected to an inverse terminal (−) of the under-voltage comparator 220.

A second terminal of the second resistor R2 is connected to a first terminal of the third resistor R3, and a second terminal of the third resistor R3 is connected to the voltage VS. The transistor 250 is connected in parallel with the third resistor R3, and performs switching operation according to an under-voltage lockout signal UVLO_OUT. The transistor 250 includes a source connected to the first terminal of the third resistor R3, a drain connected to the voltage VS, and a gate supplied with the under-voltage lockout signal UVLO_OUT.

The current source 230 supplies a current I1 for biasing the reference voltage source 240. The reference voltage source 240 includes a zener diode 241 and supplies a second reference voltage VR2. A cathode of the zener diode 241 is connected to the current source 230, and an anode of the zener diode 241 is connected to the voltage VS. The zener diode 241 maintains a voltage between the cathode and the anode with a predetermined zener voltage. The second reference voltage VR2 may be the sum of the voltage VS and the zener voltage of the zener diode 241.

The under-voltage comparator 220 determined whether the driving voltage VB is an under-voltage or not according to a result of comparison between a voltage U2 (hereinafter, referred to a detection voltage) of a node connected to the first resistor R1 and the second resistor R2 and the second reference voltage VR2.

The under-voltage comparator 220 includes an inverse terminal (−) to which the detection voltage U2 is input and a non-inverse terminal (+) to which the second reference voltage VR2 is input. The under-voltage comparator 220 generates a high-level under-voltage lockout signal UVLO_OUT when the input of the non-inverse terminal (+) is higher than the input of the inverse terminal (−). The under-voltage comparator 220 generates a low-level under-voltage lockout signal UVLO_OUT when the input of the non-inverse terminal (+) is lower than the input of the inverse terminal (−).

For example, the under-voltage comparator 220 has a hysteresis characteristic, and thus the reference voltage VR2 becomes one of an under-reference voltage UVLO− and a high-reference voltage UVLO+ according to the hysteresis characteristic. The under-voltage comparator 220 compares the high-reference voltage UVLO+ with the input of the inverse terminal (−) increases to a high voltage from a low voltage. On the contrary, the under-voltage comparator 220 compares the under-reference voltage UVLO− with the input of the inverse terminal (−) when the input of the inverse terminal (−) decreases to a low voltage from a high voltage.

Hereinafter, operation of an under-voltage lockout circuit according to an embodiment of the invention will be described with reference to FIG. 3.

Figure 3:
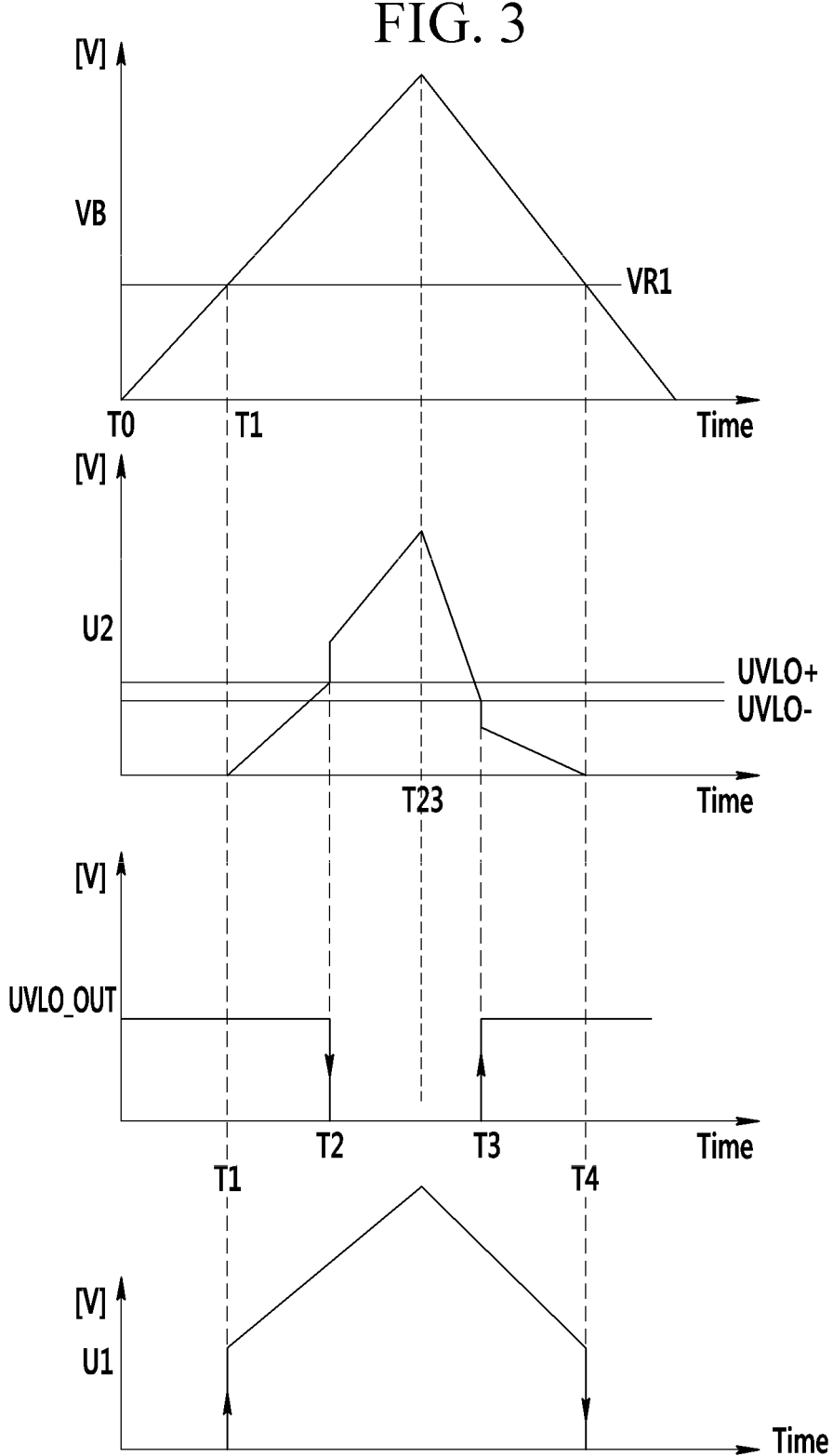
FIG. 3 shows a driving voltage waveform according to time according to the embodiment of the invention.

FIG. 3 shows a driving voltage waveform according to time for description of an embodiment of the invention.

A waveform of a driving voltage VB illustrated in FIG. 3 is set to be decreased after being increased. However, this is set for description of the under-voltage lockout circuit according to the embodiment of the invention, and the embodiment of the invention not limited thereto.

From a time T0, the driving voltage VB begins to increase. Since the driving voltage VB is lower than the first reference voltage VR1 from the time T0 until the time T1, the comparison means 110 outputs a low-level output. That is, the control signal U1 is low level.

At the time T1, the driving voltage VB reaches the reference voltage VR1 and the output of the comparison means 110, that is, the control signal U1 is increased to high level.

During a period T0 to T1, the transistor 211 maintains the turn-off state and therefore the second under-voltage lockout circuit 200 cannot be supplied with the driving voltage VB. Therefore, power consumption due to a current flowing to resistors (e.g., R1 to R3) does not occur.

The high reference voltage UVLO+ the determined by the second reference voltage VR2 is higher than an input of the inverse terminal (−) of the under-voltage comparator 220, and therefore the under-voltage comparator 220 outputs a high-level under-voltage lockout signal UVLO_OUT. When the under-voltage lockout signal UVLO_OUT according to the embodiment of the invention is low level, the driving voltage VB is in a normal range, and when the under-voltage lockout signal UVLO_OUT is high level, the driving voltage VB is in a low voltage range.

From the time T1, the transistor 211 is turned on and thus the detection voltage U2 starts to increase. At a time T2, when the increasing detection voltage U2 reaches the high reference voltage UVLO+, the under-voltage comparator 220 outputs a low-level under-voltage lockout signal UVLO_OUT. Then, the transistor 250 is turned off and the detection voltage U2 starts to increase and an increase slope also increases from the time T2.

$$U2=[R2/(R1+R2)]*VB \quad \text{[Equation 1]}$$

$$U2=[(R2+R3)/(R1+R2+R3)]*VB \quad \text{[Equation 2]}$$

Equation 1 represents the detection voltage U2 during a period T1 to T2, and Equation 2 represents the detection voltage U2 after the time T2. Since the (R2+R3)/(R1+R2+R3) is greater than R2/(R1+R2), the increase slope of the detection voltage U2 according to the driving VB is increased.

It is assumed that the driving voltage VB starts to decrease from a time T23. Accordingly, the detection voltage U2 also starts to decrease from the time T23. The decrease slope is (R2+R3)/(R1+R2+R3) as given in Equation 2. When the decreasing detection voltage reaches the low reference voltage UVLO− at a time T3, the under-voltage comparator 220 outputs a high-level under-voltage lockout signal UVLO_OUT.

Then, the transistor 250 is turned on and thus the detection voltage U2 is decreased to a voltage according to Equation 1. In addition, the decrease slope becomes R2/(R2+R3) according to Equation 1 after the time T3.

When the decreasing driving voltage VB becomes lower than the first reference voltage VR1 at a time T4, the comparison means 110 outputs a low-level control signal U1. Then, the transistor 211 is turned off. Since the detection voltage U2 is lower than the low reference voltage UVLO− after the time T3, the under-voltage lockout signal UVLO_OUT maintain high level after the time T3.

As shown in FIG. 3, the control signal U1 is high level with a waveform according to the driving voltage VB during a period T1 to T4.

As described, when the driving voltage VB is low level, operation of the second under-voltage lockout circuit 200 consumes relatively high is stopped and only the first under-voltage lockout circuit 100 is operated, and therefore power consumption for under-voltage lockout can be reduced.

Hereinafter, a switch control circuit including the under-voltage lockout circuit 10 and a power supply according to the embodiment of the invention will be described.

Figure 4:
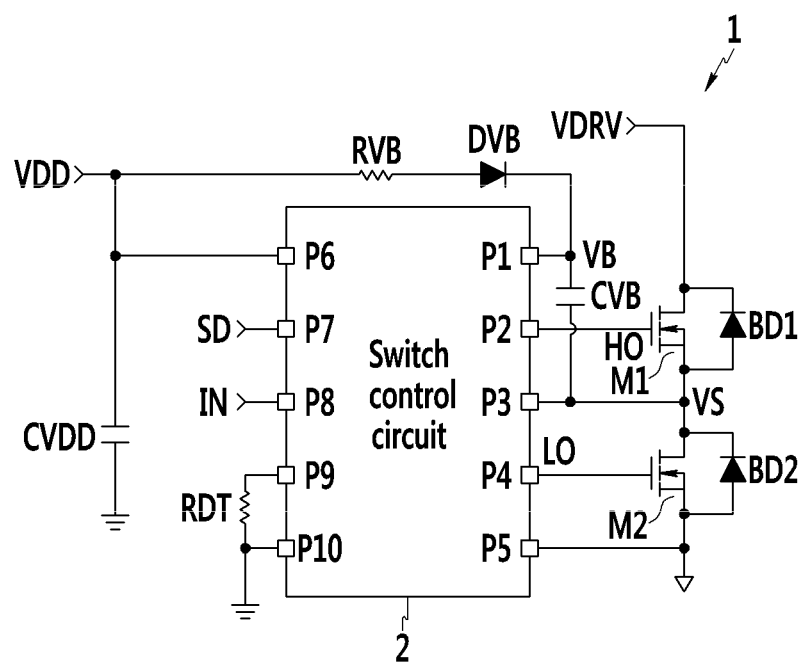
FIG. 4 shows a power supply according to the embodiment of the invention.

FIG. 4 shows a power supply according to the embodiment of the invention.

As shown in FIG. 4, a power supply 1 includes a switch control circuit 2, a high-side switch M1, a low-side switch M2, resistors RDT and RVB, capacitors CVDD and CVB, and a diode DVB. Although it is not illustrated in FIG. 4, the power supply 1 may further include a voltage VDRV, a power voltage VDD, a shut-down signal SD, and a circuit supplying an input signal IN.

A drain of the high-side switch M1 is connected to the voltage VB, a gate of the high-side switch M1 is connected to a gate voltage HO, and a source of the high-side switch M1 is connected to an output terminal of the power supply 1. A drain of the low-side switch M2 is connected to the output terminal of the power supply 1, a gate of the low-side switch M2 is connected to a gate voltage LO, and a source of the low-side switch M2 is connected to a ground of the output terminal of the power supply 1.

The high-side switch M1 and the low-side switch M2 are n-channel transistors, and body diodes BD1 and BD2 are respectively formed between the drains and the sources of the high-side switch M1 and the low-side switch M2.

A node of the source of the high-side switch M1 and the drain of the low-side switch M2 is the output terminal of the power supply 1, and a voltage of the node is an output voltage VS.

The output voltage VS swings according to switching operation of the high-side switch M1 and the low-side switch M2. For example, the output voltage VS during an on-period of the high-side switch M1 is a voltage VDRV, and the output voltage VS during an on-period of the low-side switch M2 is a ground level (e.g., 0V).

The power voltage VDD supplies a voltage for operation of the switch control circuit 2. The shut-down signal SD is a control signal that stops the operation of the switch control circuit 2, and may be enabled to activate protection operation.

The input signal IN is a signal for controlling the switching operation of the high-side switch M1 and the low-side switch M2. For example, when the input signal IN is high level, the switch control circuit 2 turns on the high-side switch M1, and when the input signal IN is low level, the switch control circuit 2 turns on the low-side switch M2.

The resistor RDT is an element that determines a dead time, and a resistance value is determined according to a design. The capacitor CVDD is connected between the power voltage VDD and the ground to remove noise of the power voltage VDD.

A first terminal of the resistor RVB is connected to the power voltage VDD, a second terminal of the resistor RVB is connected to an anode of the diode DVB, and a cathode of the diode DVB is connected to a first terminal of the capacitor CVB. A second terminal of the capacitor CVB is connected to the output voltage VS.

The driving voltage VB is generated from charging of the capacitor CVB while the diode DVB is being conducted. The driving voltage VB is controlled to be a predetermined higher level voltage with reference to the output voltage VS. For example, the driving voltage VB supplies a voltage for operation of constituent elements that control the switching operation of the high-side switch M in the switch control circuit 2.

When the driving voltage VB is an under voltage, the switch control circuit 2 generates an under-voltage lockout signal UVLO_OUT to stop the switching operation of the high-side switch M1. For example, when the detection voltage US reaches a low reference voltage UVLO– while the driving voltage VB is decreasing, the under-voltage lockout signal UVLO_OUT becomes high level and the switch control circuit 2 stops the switching operation of the high-side switch M1.

As shown in FIG. 4, the switch control circuit 2 includes ten connection pins P1 to P10. The connection pin P1 is connected to the driving voltage VB, the connection pin P2 is connected to the gate of the high-side switch M1, and the connection pin P3 is connected to the output voltage VS. The connection pin P4 is connected to the gate of the low-side switch M2, and the connection pin P5 is connected to a ground (hereinafter, referred to as a second ground) of an output terminal where the output voltage VS is generated.

The connection pin P6 is connected to the power voltage VDD. The connection pin P7 is connected to the shut-down signal SD, the connection pin P9 is connected to a first terminal of the resistor RDT, and the connection pin P10 is connected to a ground (hereinafter, a first ground) of an input terminal where an input signal is generated and a second terminal of the resistor RDT.

FIG. 4 exemplarily illustrates alignment and the corresponding connection configuration of the connection pins P1 to P10. The embodiment of the invention is not limited thereto.

Hereinafter, the switch control circuit including the under-voltage lockout circuit according to the embodiment of the invention will be described with reference to FIG. 5 and FIG. 6.

Figure 5:
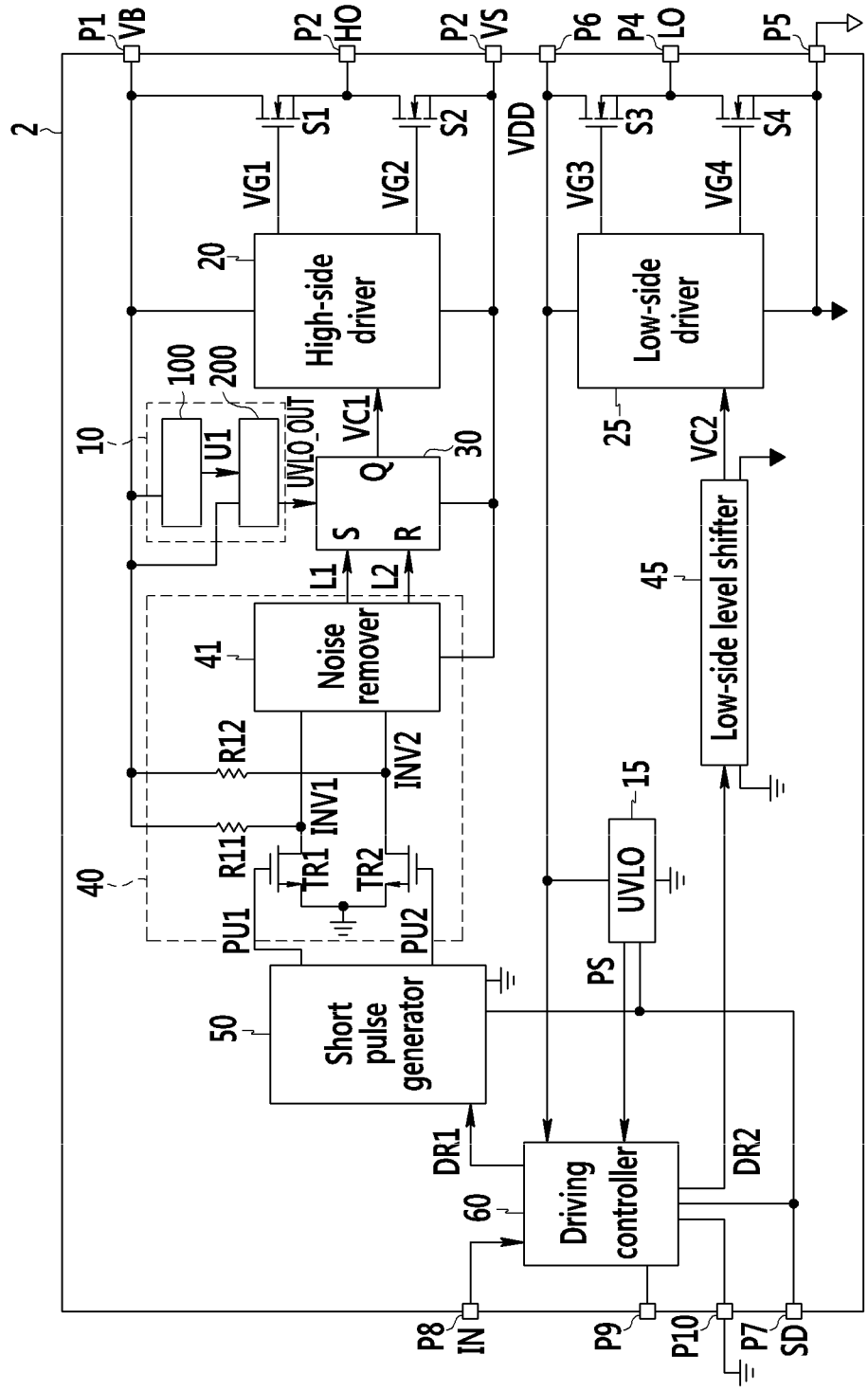
FIG. 5 shows a switch control circuit according to the embodiment of the invention.

FIG. 5 shows the switch control circuit according to the embodiment of the invention.

Figure 6:
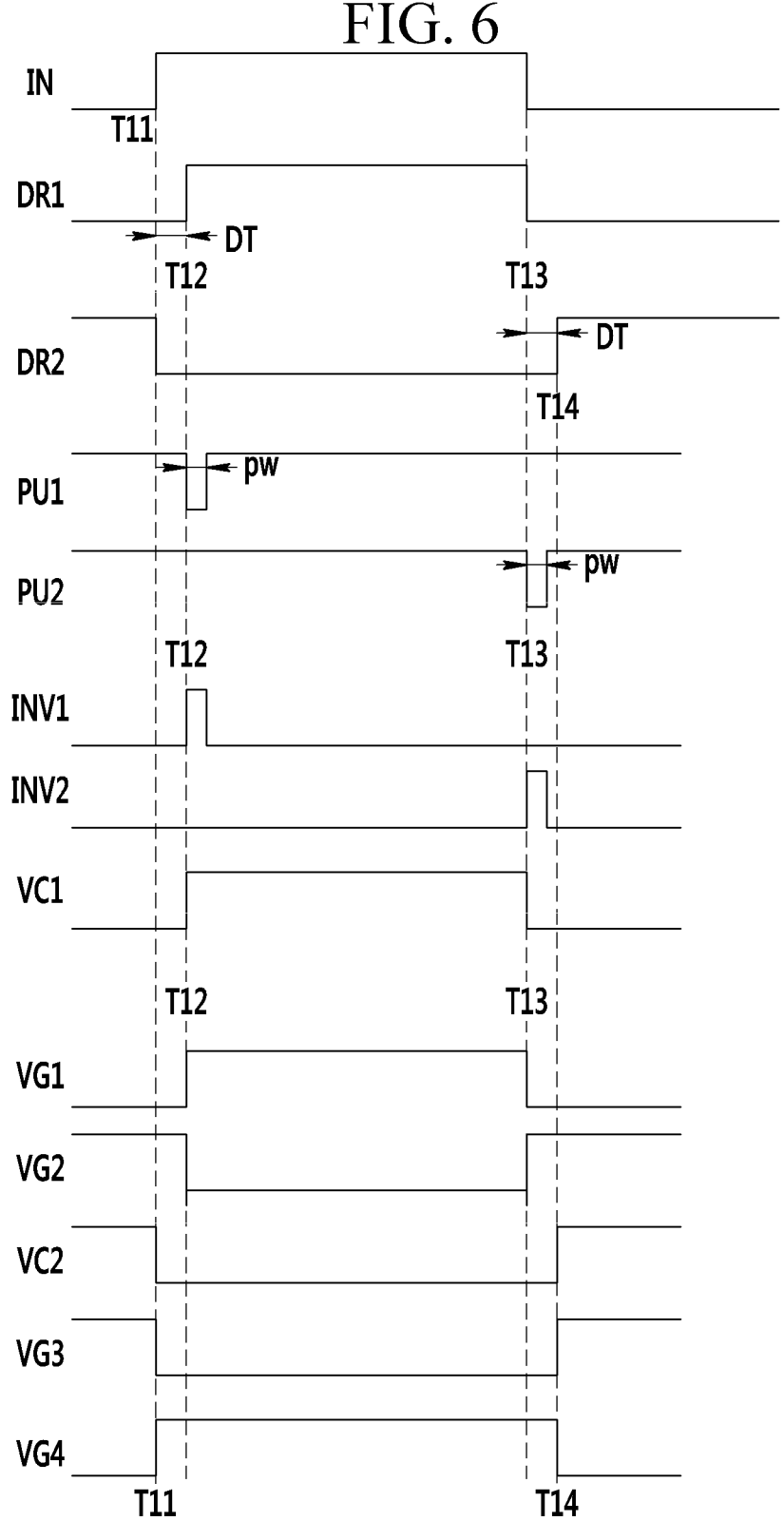
FIG. 6 is a waveform diagram of signals of the switch control circuit according to the embodiment of the invention.

FIG. 6 is a waveform diagram of signals of the switch control circuit according to the embodiment of the invention.

The switch control circuit 2 includes an under-voltage lockout circuit 10, a low-side under-voltage lockout circuit 15, a high-side driver 20, a low-side driver 25, an SR latch 30, a high-side level shifter 40, a low-side level shifter 45, a short-pulse generator 50, a driving controller 60, a delay unit 70, and first to fourth driving switches S1 to S4.

The driving controller 60 generates a first driving signal DR1 that controls the switching operation of the high-side switch M1 and a second driving signal DR2 that controls the switching operation of the low-side switch M2 according to the input signal IN. The driving controller 60 determines a dead time between the switching operation of the high-side switch M1 and the switching operation of the low-side switch M2, and stops the switching operations of the high-side switch M1 and the low-side switch M2 according to the shut-down signal SD.

For example, the driving controller 60 recognizes a level of the input signal IN and alternately changes the first driving signal DR1 and the second driving signal DR2 to an enable level by being synchronized at a time that the level of the input signal IN is changed, and a dead time between an enable period of the first driving signal DR1 and an enable period of the second driving signal DR2.

In further detail, when the input signal IN is changed from low level to high level, the driving controller 60 generates an enable-level first driving signal DR1 to turn on the high-side switch M1 at a second time T12 that is delayed by a dead time DT from a first time T11 and generates a disable-level second driving signal DR2 to turn off the low-side switch M2 at the first time T11.

When the input signal IN is changed from high level to low level, the driving controller 60 generates an enable-level second driving signal DR2 to turn on the low-side switch M2 at a fourth time T24 that is delayed by the dead time from a changed third time T13 and generates a disable-level first driving signal DR1 to turn off the high-side switch M1 at the third time T13.

In addition, the driving controller 60 protects the switch control circuit from a shoot through component of the input signal IN, and may further include a filter circuit to prevent malfunction of the switch control circuit.

The driving controller 60 receives the shut-down signal SD, and generates the disable-level first and second driving signals DR1 and DR2 when the shut-down signal SD has a level that activates the protection operation.

The driving controller 60 is connected to the first ground, and the driving controller 60 generates the first and second driving signals DR1 and DR2 with reference to a voltage level of the first ground. For example, the enable level may be high level with reference to the voltage level of the first ground, and the disable level may be the voltage level of the first ground.

The short pulse generator 50 generates a first pulse PU1 and a second pulse PU2 according to the first driving signal DR1. For example, the short pulse generator 50 maintains the first pulse PU1 and the second pulse PU with high level, and then generates the first pulse PU1 of low-level pulse (i.e., pulse width pw) by being synchronized at a rising time T12 of the driving signal DR1 and generates the second pulse PU2 of low-level pulse (i.e., pulse width pw) by being synchronized at the falling time T13 of the first driving signal DR1.

The high-side level shifterer 40 changes the levels of the first pulse PU1 and the second pulse PU2 to a predetermined level with reference to the output voltage VS. For example, the high-side level shifterer 40 changes to the first pulse PU1 and the second pulse PU2 respectively to a first level that is higher than the output voltage VS or the output voltage VS level.

The high-side level shifterer 40 includes a first inverse transistor TR1, a second inverse transistor TR2, a resistor R11, a resistor R12, and a noise remover 41. The first inverse transistor TR1 and the second inverse transistor TR2 are n-type channel transistors.

A source of the first inverse transistor TR1 is connected to the first ground, a drain is connected to the driving voltage VB through the resistor R11, and a gate is connected to the first pulse PU1.

A source of the second inverse transistor TR2 is connected to the first ground, a drain is connected to the driving voltage VB through the resistor R12, and a gate is connected to the second pulse PU2.

When the first inverse transistor TR1 is in the turn-on state, the first inverse voltage INV1 is connected to the first ground and thus becomes low level. When the first inverse transistor TR1 is turned off, the first inverse voltage INV1 becomes high level.

When the second inverse transistor TR2 is in the turn-on state, the second inverse voltage INV2 is connected to the first ground and thus becomes low level. When the second inverse transistor TR2 is turned off, the second inverse voltage INV2 becomes high level.

The noise remover 41 removes noise while changing the first inverse voltage INV1 and the second inverse voltage INV2 respectively to a first logic signal G1 and a second logic signal G2 with reference to the output voltage VS.

For example, the noise remover 41 changes the first inverse voltage INV1 (or, a second inverse voltage INV2) that is high level with reference to the first ground to a first logic signal G1 (or, a second logic signal G2) that is high level with reference to the output voltage VS.

On the contrary, the noise remover 41 changes the first inverse voltage INV1 of the first ground level (or, the second inverse voltage INV2) to a first logic signal (or, a second logic signal G2) of the output voltage VS level.

The SR latch 30 generates a high-level output when a high-level is input to a set terminal S, and resets an output to low level when the input of a reset terminal R is high level.

The set terminal S is connected to the first logic signal L1, the reset terminal R is connected to the second logic signal L2, and an output of the SR latch 30, that is, a switching control signal VC1 is output through an output terminal Q.

At the time T12, when the first logic signal L1 becomes high level by the high-level first inverse signal INV1, the switching control signal VC1 is increased to high level. At the time T13, when the second logic signal L2 becomes high level by the high-level second inverse signal INV2, the switching control signal VC1 is decreased to low level.

The high-side driver 20 generates a first gate control signal VG1 and a second gate control signal VG2 according to the switching control signal VC1.

For example, when the switching control signal VC1 is high level during a period T12 to T13, the high-side driver 20 generates a first gate control signal VG1 to turn on a first control switch S2 and generates a second gate control signal VG2 to turn off a second control switch S2.

On the contrary, when the switching control signal VC1 is low level, the high-side driver 20 generates the first gate control signal VG1 to turn off the first control switch S2 and generates the second gate control signal VG2 to turn on the second control switch S2.

A drain of the first control switch S1 is connected to the driving voltage VB and a gate is connected to the first gate control signal VG1. A drain of the second control switch S2 is connected to a source of the first control switch S1, a gate is connected to the second gate control signal VG2, and a source is connected to the output voltage VS.

A voltage of a node where the source of the first control switch 51 and the drain of the second control switch S2 is the gate voltage HI, and the gate voltage HO is connected to the gate of the high-side switch M1 through the connection pin P2.

Since the first control switch 51 and the second control switch S2 are n-type channel transistors, the first control switch 51 is turned on when the first gate control signal VG1 is high level and the second control switch S2 is turned on when the second gate control signal VG2 is high level.

Thus, during the period T12 to T13, the first gate control signal VG1 is high level and the second gate control signal VG2 is low level. During other periods, the first gate control signal VG1 is low level and the second gate control signal VG2 is high level.

The under-voltage lockout circuit 10 is an under-voltage lockout circuit as described with reference to FIG. 1, and therefore no further description will be provided. The under-voltage lockout signal UVLO_OUT is described to be supplied to the SR latch 30, but the embodiment of the invention is not limited thereto.

For example, the high-level under voltage lockout signal UVLO_OUT generated when the driving voltage VB is an under voltage resets the SR latch 30. Then, the SR latch 30 generates a low-level switching control signal VC1 and the high-side switch M1 is turned off.

When the driving voltage VB is changed to a normal range from the under voltage, or when the driving voltage VB increases to the normal range from the under voltage, a low-level under voltage lockout signal UVLO_OUT is generated. The low-level under-voltage lockout signal UVLO_OUT normally operates the SR latch 30. That is, the SR latch 30 generates the switching control signal VC1 according to inputs of the set terminal S and the reset terminal R.

The UVLO 15 generates a protection signal PS to stop operation of the driving controller 60 when the power voltage VDD is an under voltage. The power voltage VDD supplies a voltage for operation of the driving controller 60. The operation of the UVLO 15 can be stopped by the shut-down signal SD.

The low-side level shifter 45 generates the switching control signal VC2 to control switching operation of the low-side switch M2 according to the second driving signal DR2. For example, the low-side level shifter 45 can generate the switching control signal VC2 by level-shifting the second driving signal DR2 with reference to the second ground.

The low-side driver 25 generates a third gate control signal VG3 and a fourth gate control signal VG4 according to the switching control signal VC2.

For example, when the switching control signal VC2 is high level (i.e., a period excluding a period T11 to T14 in FIG. 6), the third gate control signal VG3 is generated to turn on the third control switch S3 and the fourth gate control signal VG4 is generated to turn off the fourth control switch S4.

On the contrary, when the switching control signal VC2 is low level (i.e., during the period T11 to T14 in FIG. 6), the third gate control signal VG3 is generated to turn off the third control switch S3 and the fourth gate control signal VG4 is generated to turn on the fourth control switch S4.

A drain of the third control switch S3 is connected to the power voltage VDD and a gate is connected to the third gate control signal VG3. A drain of the fourth control switch S4 is connected to a source of the third control switch S3, a gate is connected to the fourth gate control signal VG4, and a source is connected to the second ground.

A voltage of a node where the source of the third control switch S3 and the drain of the fourth control switch S4 is a low-side gate voltage Lo, and the low-side gate voltage LO is connected to the gate of the low-side switch M2 through the connection pin P4.

Since the third control switch S3 and the fourth control switch S4 are n-type channel transistors, the third control switch S3 is turned on when the third gate control signal VG3 is high level and the fourth control switch S4 is turned on when the fourth gate control signal VG4 is high level.

Thus, during the period T11 to T14, the third gate control signal VG3 is low level the fourth gate control signal VG4 is high level. During other periods, the third gate control signal VG3 is high level and the fourth gate control signal VG4 is low level.

The high-side driver 20 is supplied with a voltage for operation from the driving voltage VB, and the low-side driver 25 supplies a voltage for operation from the power voltage VDD.

According to the embodiment of the invention, the switch control circuit including the under-voltage lockout circuit and the power supply can reduce power consumption.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS power supply 1, switch control circuit 2, under-voltage lockout circuit 10
first under-voltage lockout circuit 100, second under-voltage lockout circuit 200
comparison means 110, first reference voltage source 120, reference voltage source 240
transistor (111, 112, 123, 124, 250)
first inverse transistor TR1, second inverse transistor TR2
first current source 121, second current source 122, current source 230
switch 210, first to third resistor R1-R3, under-voltage comparator 220
high-side switch M1, low-side switch M2
resistor R11, R12, RDT, RVB, capacitor CVDD, CVB
diode DVB, low-side under-voltage lockout circuit 15
high-side driver 20, low-side driver 25, SR latch 30
high-side level shifter 40, low-side level shifter 45,
short pulse generator 50, driving controller 60, delay unit 70
first to fourth driving switch (S1-S4), noise remover 41

What is claimed is:

1. An under-voltage lockout circuit comprising:
a first under-voltage lockout circuit configured to compare a driving voltage with a first reference voltage; and
a second under-voltage lockout circuit configured to generate an under-voltage lockout signal based on a result of the comparison between the driving voltage and a second reference voltage,
wherein the first under-voltage lockout circuit is configured to stop operation of the second under-voltage lockout circuit when the driving voltage is lower than the first reference voltage and configured to operate the second under-voltage lockout circuit when the driving voltage is higher than the first reference voltage, and
power consumption of the first under-voltage lockout circuit is limited by a first current that generates the first reference voltage.

2. The under-voltage lockout circuit of claim 1, wherein the first under-voltage lockout circuit comprises:
a first reference voltage source configured to generate a first reference voltage using the first current; and
a comparison device configured to output a result of the comparison between the first reference voltage and the driving voltage, and
wherein operation of the second under-voltage lockout circuit is controlled based on the output of the comparison device.

3. The under-voltage lockout circuit of claim 2, wherein the comparison device comprises:
a first transistor including a gate to which the first reference voltage is input, a first terminal coupled with the driving voltage, and a second terminal coupled with an output terminal of the comparison device, and
a second transistor configured to control a current flowing to the first transistor by mirroring the first current.

4. The under-voltage lockout circuit of claim 3, wherein the first reference voltage source comprises:
a first current source and a second current source configured to supply the first current;
a third transistor including a drain coupled to the first current source, and a gate coupled to the drain; and
a fourth transistor including a drain coupled to the second current source and a source of the first transistor and a gate coupled to the drain,
wherein a current mirror is formed by coupling the gate of the second transistor and the gate of the fourth transistor.

5. The under-voltage lockout circuit of claim 4, wherein the first reference voltage is the sum of a gate-source voltage of the third transistor and a gate-source voltage of the fourth transistor.

6. The under-voltage lockout circuit of claim 1, wherein the second under-voltage lockout circuit comprises:
a switch coupled to the driving voltage, and configured to be switched based on a control signal generated based on a result of the comparison between the driving voltage and the first reference voltage in the first under-voltage lockout circuit;
a plurality of resistors connected to the switch in series;
a reference voltage source configured to supply the second reference voltage;
an under-voltage comparator including a first input terminal coupled with the reference voltage source and a second input terminal coupled with a detection voltage of a node where a first resistor and a second resistor among the plurality of resistors are coupled, and configured to generate an under-voltage lockout signal based on a result of a comparison between an input of the first input terminal and the detection voltage; and
a fifth transistor coupled to a third resistor among the plurality of resistors in parallel,
the fifth transistor is controlled by the under-voltage lockout signal.

7. The under-voltage lockout circuit of claim 6, wherein the second under-voltage lockout circuit further comprises a third current source supplying a current to bias the reference voltage source.

8. The under-voltage lockout circuit of claim 7, wherein the reference voltage source further comprises a zener diode, wherein
a current of the third current source is supplied to a cathode of the zener diode and the cathode of the zener diode is coupled to the first input terminal of the under-voltage comparator, and
the second reference voltage is determined based on a zener voltage of the zener diode.

9. The under-voltage lockout circuit of claim 6, wherein a first terminal of the switch is coupled to the driving voltage, a second terminal of the switch is coupled to a first terminal of the first resistor of the plurality of resistors, a second terminal of the first resistor is coupled to a first terminal of the second resistor, and a first terminal of the third resistor is coupled to a second terminal of the second resistor.

10. The under-voltage lockout circuit of claim 6, wherein the under-voltage comparator has a hysteresis characteristic,
the second reference voltage becomes a high reference voltage based on the hysteresis characteristic when the detection voltage is increased to a high voltage from a low voltage, and
the second reference voltage becomes a low reference voltage based on the hysteresis characteristic when the detection voltage is decreased to a low voltage from a high voltage.

11. The under-voltage lockout circuit of claim 6, wherein the first under-voltage lockout circuit comprises a comparison device configured to output the control signal based on a result of the comparison between the first reference voltage and the driving voltage.

12. The under-voltage lockout circuit of claim 11, wherein the first under-voltage lockout circuit comprises:
a first transistor including a gate to which the first reference voltage is input, a first terminal coupled to the driving voltage, and a second terminal coupled to an output terminal of the comparison device,
when the driving voltage becomes higher than the first reference voltage and thus the first transistor is turned on, the control signal is changed to a level that can turn on the switch by the driving voltage.

13. The under-voltage lockout circuit of claim 12, wherein the first under-voltage lockout circuit further comprises:
a first current source and a second current source configured to supply the first current and a second transistor configured to control a current flowing to the first transistor by mirroring the first current.

14. The under-voltage lockout circuit of claim 13, wherein the first under-voltage lockout circuit further comprises:
a third transistor including a drain coupled to the first current source and a gate coupled to the drain, and
a fourth transistor including a drain coupled to the second current source and a source of the first transistor and a fourth transistor including a gate coupled to the drain,
a current mirror is formed by coupling the gate of the second transistor and the gate of the fourth transistor.

15. A switch control circuit controlling switching operation of a high-side switch and a low-side switch in a power supply, comprising:
a first under-voltage lockout circuit configured to compare a driving voltage for controlling the switching operation of the high-side switch with a first reference voltage and
a second under-voltage lockout circuit configured to generate an under-voltage lockout signal based on a result of the comparison between the driving voltage and a second reference voltage, wherein
the first under-voltage lockout circuit is configured to stop the second under-voltage lockout circuit when the driving voltage is lower than the first reference voltage and configured to operate the second under-voltage lockout circuit when the driving voltage is higher than the first reference voltage, and
power consumption of the first under-voltage lockout circuit is limited by a first current that generates the first reference voltage.

16. The switch control circuit of claim 15, wherein the switch control circuit comprises:
a driving controller configured to generate a first driving signal for controlling switching operation of the high-side switch and a second driving signal for controlling switching operation of the low-side switch based on an input signal;
a short-pulse generator configured to generate a first pulse and a second pulse based on the first driving signal;
a high-side level shifter configured to level-shift the first pulse and the second pulse to a first logic signal and a second logic signal with reference to an output voltage of a node where the high-side switch and the low-side switch are coupled; and
an SR latch configured to generate a first switching control signal that controls switching operation of the high-side switch based on the first logic signal and the second logic signal.

17. The switch control circuit of claim 16, wherein an output of the SR latch is reset by an output of the second under-voltage lockout circuit generated when the driving voltage is lower than the second reference voltage so that the switching operation of the high-side switch is stopped.

18. The switch control circuit of claim 16, wherein the second under-voltage lockout circuit comprises:
a switch coupled to the driving voltage, and configured to be switched by a control signal generated based on a result of the comparison between the driving voltage and the first reference voltage in the first under-voltage lockout circuit;
a plurality of resistors coupled to the switch in series;
a reference voltage source configured to supply the second reference voltage;
an under-voltage comparator including a first input terminal coupled with the reference voltage source and a second input terminal coupled with a detection voltage of a node where a first resistor and a second resistor among the plurality of resistors are coupled, the under-voltage comparator configured to generate an under-voltage lockout signal based on a result of comparison between an input of the first input terminal and the detection voltage; and a fifth transistor coupled to a third resistor among the plurality of resistors in parallel, the fifth transistor is controlled by the under-voltage lockout signal.

19. A power supply comprising:

a high-side switch;

a low-side switch connected to the high-side switch in series;

a switch control circuit configured to control switching operation of the high-side and low-side switches; and a diode and a capacitor connected in series between a power voltage supplied for operation of the switch control circuit and an output voltage of a node where the high-side switch and the low-side switch are coupled, wherein the switch control circuit comprises, a first under-voltage lockout circuit configured to compare a driving voltage generated in the capacitor with a first reference voltage and a second under-voltage lockout circuit configured to generate an under-voltage lockout signal based on a result of the comparison between the driving voltage and a second reference voltage, wherein the first under-voltage lockout circuit is configured to stop the second under-voltage lockout circuit when the driving voltage is lower than the first reference voltage and configured to operate the second under-voltage lockout circuit when the driving voltage is higher than the first reference voltage, and power consumption of the first under-voltage lockout circuit is limited by a first current that generates the first reference voltage.

20. The power supply of claim 19, wherein the second under-voltage lockout circuit comprises:

a switch coupled to the driving voltage, and configured to be switched based on a control signal generated based on a result of the comparison between the driving voltage and the first reference voltage in the first under-voltage lockout circuit;

a plurality of resistors connected to the switch in series;

a reference voltage source configured to supply the second reference voltage;

an under-voltage comparator including a first input terminal coupled with the reference voltage source and a second input terminal coupled with a detection voltage of a node where a first resistor and a second resistor among the plurality of resistors are coupled, the under-voltage comparator configured to generate an under-voltage lockout signal based on a result of comparison between an input of the first input terminal and the detection voltage; and a fifth transistor coupled to a third resistor among the plurality of resistors in parallel, and the fifth transistor is controlled by the under-voltage lockout signal.

* * * * *